United States Patent Office 2,780,656
Patented Feb. 5, 1957

2,780,656

PROCESS FOR PREPARING NITRO COMPOUNDS

William G. Toland, Jr., San Rafael, Calif., assignor to California Research Corporation, San Francisco, Calif., a corporation of Delaware No Drawing. Application January 4, 1954,
Serial No. 402,141

4 Claims. (Cl. 260—645)

This invention relates to a process for preparing organic nitro compounds. More particularly, the invention is concerned with a novel method for the production of useful nitro aromatic hydrocarbons.

Nitro aromatic hydrocarbons such as nitrobenzene are valuable intermediates for the production of dyes and other chemicals.

I have now found that nitrobenzene can be prepared by a process which comprises heating benzene and a silver or copper nitrate to a temperature above about 175° C.

The aromatic hydrocarbons which are converted to nitro aromatic hydrocarbons pursuant to the process of my invention include the mononuclear and polynuclear types of both fused and isolated rings. Examples of suitable aromatic hydrocarbons of these types include benzene, diphenyl, terphenyl, naphthalene, anthracene, phenanthrene, indan, indacene, and tertiary butyl benzene.

Any silver or copper nitrate may be employed in the reaction. The hydrates, copper nitrate trihydrate and copper nitrate hexahydrate, are quite suitable.

The reaction is carried out at elevated temperatures above about 175° C. In the preferred operation, the temperatures should not exceed the critical point of the aromatic hydrocarbon. Temperatures of 175 to 375° C. and particularly those from 250 to 360° C. are most satisfactory.

Solvents may also be employed in the reaction but are not considered essential. When high molecular weight nitro aromatic hydrocarbons are prepared, it is convenient to use a low molecular weight paraffinic hydrocarbon solvent such as isopentane to facilitate handling of the materials. Water may also be employed.

As a further illustration of the invention, the following examples are submitted. The proportions given are on a weight basis unless otherwise specified.

*Example 1*

Into a 4.5 liter stainless steel autoclave were charged 900 ml. of water, 780 grams of benzene and 241 grams of copper nitrate trihydrate. The autoclave was closed and heated to 315° C. and maintained at that temperature for a period of one hour. During this period, the pressure rose to 3150 p. s. i. g. autogeneously. The autoclave was cooled to room temperature and the residual pressure dropped to 300 p. s. i. g. The gas was bled out through a caustic scrubber and the autoclave opened. The reaction products consisted of two liquid phases with a black solid residue at the bottom. The reaction products were filtered to remove elemental copper formed in the reaction.

The two liquid phases, consisting of a lower water layer and an upper organic layer, were separated. The organic layer was distilled to give a benzene fraction and a nitrobenzene fraction.

The nitrobenzene fraction obtained above boiled at 207 to 210° C. It has a density D 20/4 equal to 1.1923 and a refractive index n D/20 equal to 1.5523. These constants correspond closely to those for pure nitrobenzene.

After the nitrobenzene fraction was distilled, a bottoms fraction of polynitrobenzenes remained. The polynitrobenzenes crystallized when chilled in a mixed ice and salt bath. They were insoluble in mixed hexanes but soluble in benzene.

*Example 2*

A glass liner in a 4.5 liter stainless steel autoclave was charged with 900 cc. water, 780 grams benzene, and 170 grams silver nitrate. The autoclave was sealed and heated to 275° C. for two hours with shaking. The pressure reached 1500 p. s. i. g. The contents were removed when the bomb had cooled and were filtered to give 81.9 grams of metallic silver. The filtrate consisted of a water layer and an organic liquid layer. The latter, on distillation, yielded 740 grams of benzene, 14 grams of nitrobenzene, and about 5 grams of more highly nitrated material which slodified on cooling to room temperature.

The process can also be carried out continuously as well as batchwise. When mononitro compounds are desired, the process is operated to give low conversions per pass and the unconverted aromatic hydrocarbon recycled.

The elemental copper or silver produced in the reaction may be recovered and reconverted to copper or silver nitrate and used again in the process.

I claim:

1. A process for preparing nitrobenzene consisting essentially in reacting benzene and a salt selected from the group consisting of copper nitrate and silver nitrate in the liquid phase at a temperature above 175° C.

2. A process for preparing nitrobenzene consisting essentially in reacting benzene and a salt selected from the group consisting of copper nitrate and silver nitrate in the liquid phase at a temperature in the range of 175° to 375° C.

3. A process for preparing nitrobenzene consisting essentially in reacting benzene and copper nitrate in the presence of water and in the liquid phase at a temperature in the range of 250° to 360° C.

4. A process for preparing nitrobenzene consisting essentially in reacting benzene and silver nitrate in the presence of water and in the liquid phase at a temperature in the range of 260° to 360° C.

References Cited in the file of this patent

FOREIGN PATENTS 235,698 Great Britain _____ June 25, 1925

OTHER REFERENCES

Backarach: J. Am. Ch. Soc., vol. 49, 1522–7 (1927). (Copy in Sci. Library.)